United States Patent
Matthews et al.

(10) Patent No.: US 6,349,133 B1
(45) Date of Patent: Feb. 19, 2002

(54) METHOD AND SYSTEM FOR INTERFACING A TELEPHONY NETWORK AND A DIGITAL DATA STREAM

(75) Inventors: Gordon H. Matthews; Larry A. Stell, both of Austin; Richard A. Gibbs, Round Rock; Martin L. Herring, Austin; Patrick Koons, Dallas; Robert H. Frantz, Plano, all of TX (US)

(73) Assignee: Premisenet Incorporated, Richardson, TX (US)

( * ) Notice: Subject to any disclaimer, the term of this patent is extended or adjusted under 35 U.S.C. 154(b) by 0 days.

(21) Appl. No.: 09/060,618

(22) Filed: Apr. 15, 1998

(Under 37 CFR 1.47)

(51) Int. Cl.⁷ .............................................. H04M 11/00
(52) U.S. Cl. ............................... 379/90.01; 379/93.05; 379/93.08; 370/352
(58) Field of Search ..................... 379/90.01, 93.05, 379/93.06, 93.07, 93.08, 93.28, 93.31; 370/352, 353, 355, 356

(56) References Cited

U.S. PATENT DOCUMENTS

| | | | |
|---|---|---|---|
| 4,776,006 A | 10/1988 | Comerford et al. | 379/159 |
| 4,807,225 A | 2/1989 | Firth | 370/71 |
| 5,195,086 A | 3/1993 | Baumgartner | 370/62 |
| 5,283,807 A | 2/1994 | Graham | 375/1 |
| 5,347,225 A | 9/1994 | Graham | 324/523 |
| 5,365,515 A | 11/1994 | Graham | 370/17 |
| 5,379,005 A | 1/1995 | Aden et al. | 333/24 R |
| 5,422,919 A | 6/1995 | Graham | 375/200 |
| 5,450,594 A | 9/1995 | Aden et al. | 395/200.06 |
| 5,467,061 A | 11/1995 | Aden et al. | 333/24 |
| 5,483,577 A | 1/1996 | Gulick | 379/67 |
| 5,550,900 A | 8/1996 | Ensor et al. | 379/67 |
| 5,566,231 A | 10/1996 | Sizer, II | 379/142 |
| 5,566,232 A | 10/1996 | Sizer, II | 379/142 |
| 5,587,692 A | 12/1996 | Graham et al. | 333/12 |
| 5,596,631 A | 1/1997 | Chen | 379/177 |
| 5,696,790 A | 12/1997 | Graham et al. | 375/238 |
| 5,825,777 A | * 10/1998 | Komarek et al. | 370/458 |
| 6,081,519 A | * 6/2000 | Petler | 370/356 |
| 6,167,043 A | * 12/2000 | Frantz | 370/356 |
| 6,236,653 B1 | * 5/2001 | Dalton et al. | 370/352 |

FOREIGN PATENT DOCUMENTS

| | | | |
|---|---|---|---|
| CA | 9405618 | 3/1994 | C07C/45/46 |
| JP | 402228868 A | * 9/1990 | H04M/11/06 |

* cited by examiner

*Primary Examiner*—Huyen Le
*Assistant Examiner*—Melur Ramakrishnaiah
(74) *Attorney, Agent, or Firm*—Baker Botts L.L.P.

(57) ABSTRACT

A method and system interface a digital data stream having at least one telephony data set with a telephony network, such as a single twisted wire pair telephony network installed in a residence or business. The telephony data set is converted to a telephony signal for use by conventional telephony devices, such as telephones, and is transmitted through the telephony network in a telephony network band. The telephony network band can be located outside of the voiceband to avoid interference with central office signals. Plural data telephony data sets can each provide a telephony signal directed to one or more telephony devices associated with the telephony network. Telephone control modules interfaced associated with the telephony devices can translate telephony signals from the telephony network band to the voiceband for use by the associated telephony devices. The method and system can support plural simultaneous telephony communications through a single twisted pair or other telephony network. The digital data stream can comprise a TCP/IP data stream transmitted through internet transmission mediums, including telephone and cable internet interfaces with a personal computer.

37 Claims, 2 Drawing Sheets

METHOD AND SYSTEM FOR INTERFACING A TELEPHONY NETWORK AND A DIGITAL DATA STREAM

TECHNICAL FIELD OF THE INVENTION

This invention relates in general to the field of telephony communications, and more particularly to supporting multiple telephony communications through a single network.

BACKGROUND OF THE INVENTION

Rapid advances in technology relating to telephony communications have led to increasingly useful applications for both businesses and homes. The Internet and World Wide Web now reach millions of businesses and homes around the world in what is commonly coined the "Information Super Highway."

One driving force behind the Information Super Highway has been the development and reliance upon uniform data transmission protocols such as the transport control protocol/internet protocol, known as TCP/IP. This protocol and other common protocols, such as hypertext transport protocol, have made the internet and World Wide Web accessible to virtually every computer.

One recent useful internet application relates to the transmission of voice, video, or other communication data through a personal computer and the Internet using a TCP/IP digital data stream. Using voice as an example of one type of communication data that can be transported in a digital data stream will help to make clear the economic potential of this technology. A personal computer user can speak into a microphone associated with his computer. The computer accepts the electronic signal from the microphone and converts the signal into digital data. The digital data can then be injected into a TCP/IP digital data stream and directed to another computer interface with the Internet anywhere in the world. Thus, the two users can communicate as if by telephone but without placing a direct call to each other.

The ability to inject voice and other communication data into a TCP/IP or other digital data stream has many attractive advantages to computer users. For instance, two internet computer users can communicate with voice, video or other data through the Internet without incurring any long distance telephone fees. Each user simply must have a local internet connection, such as through an Internet service provider, and each user must know how to contact the other user such as with the other user's internet address.

One difficulty with communicating voice data over the internet is that each user must have a personal computer loaded with software capable of accepting the digital telephony data and converting the digital data into normal sounds. Users must be "computer smart" to accomplish such communication, and each user must invest in hardware and software adequate to handle the demands of converting the digital data stream to voice or other communication data, and vice versa.

Another difficulty of present technology for transmitting voice and other communication data through the internet is that a computer interfaced with the internet typically ties up the telephone line used for that interface. For instance, an internet user interfaced through a residential phone line can make unusable all other telephony devices associated with that residence's telephony network. Thus, each connection to the internet requires a separate telephone line or other transmission medium. This can result in significant wasted band width since the telephone line is tied up by the internet interface, even if little or any actual data is transmitted across the internet at any given time.

An internet user can increase access to the internet in a number of ways. First, the internet user can have second or multiple telephone lines run to his house or business. However, each telephone line carries an additional cost. Alternatively, an internet user can have high band width lines, such as ISDN or other dedicated services, interface with his home to allow greater amounts of data through the internet to the user's computer. Again however, such lines carry additional expense and result in wasted bandwidth during periods of reduced need to transmit data over the internet.

SUMMARY OF THE INVENTION

Therefore, a need has arisen for a method and system which supports transmission of telephony data through the internet with minimal hardware and software costs.

A further need exists for a system and method which uses existing telephone systems to transmit digital data in a way that fully utilizes available bandwidth.

A further need exists for a method and system which simultaneously supports internet access, communications data transmission, such as voice and video data, and existing telephony communications without interfering with each other.

A further need exists for a method and system that promotes transmission of communications data, including telephony data and control data, but that remains downward compatible with existing telecommunications equipment, including installed residential and business telephony networks that utilize single twisted pair telephone lines.

A further need exists for a method and system that supports internet connections without blocking the acceptance of additional telephony communications to a telephony network.

In accordance with the present invention, a method and system for interfacing a telephony network and a digital data stream having communications data is provided that substantially eliminates or reduces disadvantages and problems associated with previously developed methods and systems for transmitting digital data over a transmission medium. A digital data stream having at least one telephony data set is transmitted through a transmission medium at a transmission medium band to a telephony network. The telephony data set is converted to a telephony signal and transmitted through the telephony network in a telephony network band.

A user can generate an outbound telephony signal with the telephony device for transmission across the telephony network in the telephony network band. The outbound telephony signal can then be converted to an outbound telephony data set for transmission through the transmission medium in the transmission medium band.

More specifically, the present invention allows for the conversion of an existing telephony network, such as the single twisted pair typically found in a residence, into an equivalent multi-line, multi-station telephone system. Telephony networks can be supported with existing twisted pair lines or other lines, such as untwisted pair lines, coaxial cable, and fiber lines whether shielded or unshielded lines, and wireless networks. The telephony network has plural telephony nodes, such as the tip and ring interfaces and RJ-11 jacks common to the industry and that allow telephony devices, such as telephones, to interface with the single twisted pair. The telephony network can receive a digital data stream through at least one of the telephony nodes or through another interface operable to receive a digital data stream from a transmission medium. For instance, a home can receive a TCP/IP internet data stream from an internet service provider through a telephone line interfaced with a central office, the internet data stream including the digital data in the voiceband of the telephone network. Alternatively, a home can receive an internet data stream through a broadband service, such as a coaxial cable and a cable modem, and can make the digital data stream available to the telephone line through an interface with a computer system. The digital data stream can contain communications data, including telephony data for supporting telephony communications, and control data for supporting functional operations such as environmental, security, meter reading, and power control. The digital data stream can have plural telephony data sets, each set supporting telephony communications, such as voice communication, video communication, or fax communication.

A digital converter associated with the telephony network can convert each telephony data set into a telephony signal, such as an analog voice signal typically used to support telephone voice communications. Each telephony signal can be transmitted over the telephony network in a telephony network band by translating each telephony signal to an appropriate telephony network band frequency with frequency translators, such as frequency modulators. For instance, a control program can use frequency division multiplexing to transmit two-way telephony signals, such as will support a telephone conversation, in a first and second channel within a telephony network band. The control program can direct the transmissions to occur outside of the central office voice band to prevent interference with central office signals. Further, control program can support plural telephony and other functions in plural telephony network band channels by ensuring that transmission channels have adequate separation to avoid interference.

Telephone control modules interfaced with the telephony network can receive the telephony signals in the telephony network band and can translate those signals, such as with a frequency demodulator, to a band appropriate for a telephony device, such as to the voice band used by most telephone devices.

A processor and control program can communicate with the telephone control modules to arrange transmission of each telephony data set to predetermined telephone control modules. For instance, if a telephony data set includes identification data associated with a predetermined telephone control module, the processor and control program can direct the converter to convert the telephony data set into a telephony signal for transmission through a telephony network band. The processor and control program can then direct the telephone control module identified by the telephony data set to receive the telephony signal at the predetermined telephony network band. A frequency translator associated with the telephone control module can then translate the telephony signal to the voice band for use by a telephony device.

In one embodiment, the method and system of the present invention can support multiple telephony communications with multiple telephony devices simultaneously over a single twisted pair line. The digital converter can accept the digital data stream, and can convert plural telephony data sets within the digital data stream into plural telephony signals. Each signal can then be transmitted across the telephony network at that signal's own telephony network band, or so that each signal is transmitted at its own channel within the telephony network band. The processor and control program can communicate with the telephone control modules so that only predetermined control modules will receive telephony signals transmitted at predetermined telephony network bands or channels. Thus, as one example, two telephones interfaced with the same twisted pair can simultaneously communicate in separate conversations transmitted as telephony signals at different telephony network bands.

In alternative embodiments, the present invention can use techniques in addition to or as a replacement of frequency division multiplexing in order to support multiple telephony signals on an existing telephony network, such as a single twisted pair. For instance, the converters can combine the use of frequency division multiplexing with time division multiplexing or packet-based signaling, such as STM or ATM, to transmit telephony signals over the telephony network in the telephony network band as digital data. The telephone control modules can then translate the telephony signals to analog signals in the voice band for use by a telephony device. The telephone network band can exclude the central office voiceband to avoid interference with central office signals; alternatively, the telephone network band can include the voice band with low power transmission techniques such as spread spectrum transmissions.

In alternative embodiments, the present invention can cooperate with available telephony functions of the central office to enhance communications available to the telephony network. For instance, if a telephone line associated with a telephone number is in use, a call directed to that telephone line can be call forwarded as an available service of most central offices. The call can be forwarded to a voice gateway for conversion to a TCP/IP digital data stream and for transmission over the internet by an internet service provider. The internet service provider can direct the digital data stream to an internet connection of the telephony network so that the forwarded call can be placed to the intended recipient. Thus, for instance, if a user is interfaced with the internet through the user's telephone line, the user can receive telephone calls placed to him. The control program can make the method for receiving the telephone call through the internet indiscernible to the user by making the call available to the user's standard telephone network and telephone as if the telephony network were not being used to interface with the internet.

The present invention provides important technical advantages. For instance, a home or business having a single twisted pair line can support plural telephony communications simultaneously. The additional telephony communications are supported with minimal hardware and software enhancements and without the need for rewiring the home or business.

Another important technical advantage results from the ability of the present method and system to accept a digital data stream from any transmission medium for conversion to a form usable by analog telephony devices commonly found in homes and businesses. Thus, the present method and system can allow the use of advanced technology but also supports existing telephony equipment in a user friendly manner.

Another technical advantage of the present invention is the ability to use communication data simultaneously, including telephony data and control data. Thus, for instance, the present method and system can support telephony communications, such as a telephone call, while simultaneously supporting communication of control data, such as environmental, security, meter reading or power control data.

Another technical advantage of the present method and system is the ability to accept and use a wide variety of digital telephony data. For instance, the data stream can include video, voice, fax, e-mail, or other forms of digital communication across any transmission medium at any transmission medium band. The present method and system can reserve the voice band on the telephony network to avoid interference with central office telephony communications, and use other frequency bands to maximize the amount of data that can be transmitted over a given network wiring system.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Preferred embodiments of the present invention are illustrated in the FIGUREs, like numeral being used to refer to like and corresponding parts of the various drawings.

Although telephony technology has rapidly advanced over the past several years, the framework for telephony communication has remained substantially unchanged, primarily because new telephony technology must remain compatible with existing and installed telephony equipment and networks. Telephone calls are transmitted from an originating point through a central office to a calling destination, all in a very narrow voiceband frequency range. The central office uses a narrow voiceband frequency range of 300 Hz to 4000 Hz, and filters out signals outside of this voiceband. FCC regulations limit the transmissions which a user can place on a telephone line in order to avoid interference with transmissions made in the voiceband.

Figure 1:
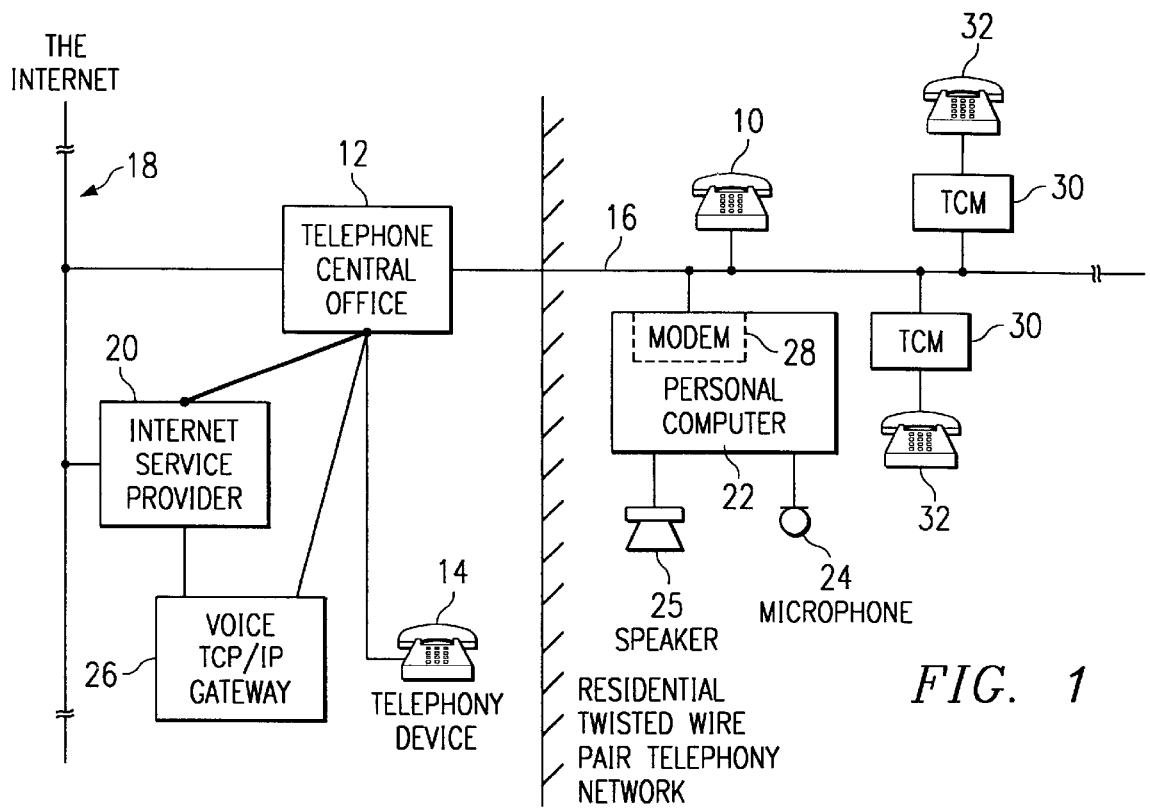
FIG. 1 depicts an overview of multi-station telephone system interfaced with a telephony network.

Referring now to FIG. 1, an exemplary path of a typical telephone call can be explained to illustrate the compatibility of the present invention with existing telephony networks. A user of telephone device 10 transmits a destination telephone number to a central office 12, which connects telephone device 10 with, for example, telephony device 14. Telephone central office 12 simply provides a connection between telephony devices 10 and 14 by which an analog electronic representation communicates telephony information, such as voice, through a voiceband frequency. Typically, a single twisted wire pair 16 forms the connection between each telephony device and central office 12. Central office 12 typically uses a circuit switch to connect the twisted wire pair associated with each respective telephony device.

A number of telephony devices transmit data in the voiceband but in a digital rather than analog format. One common example of digital data transmitted over the voice band is the transmission of data by a modem over the internet 18, which use TCP/IP to communicate the digital data. Residences and businesses communicate through the internet 18 by typically interfacing with internet service providers 20. For instance, personal computer 22 can establish a digital communication link in the voice band through telephone central office 12 to internet 18. Personal computer 22 can establish an internet connection directly if properly equipped, or can establish the internet connection through internet service provider 20. When personal computer 22 establishes an internet connection, the connection generally uses up the entire voice band available through the telephone's central office. Some transmission techniques, such as ADSL, take advantage of the frequencies unused by the voiceband to transmit data through a central office without interfering with the voiceband.

A digital telephony data set can be inserted into a digital data stream for transmission across internet 18. First, a user can speak directly into a microphone 24 thus generating an analog voice signal, and can hear signals with associated speakers 25. Personal computer 22 can convert the voice signals received from microphone 24 for transmission across internet 18. Alternatively, a user can transmit a voice analog signal from telephony device 14 through telephone central office 12 to an internet service provider 20 or voice TCP/IP gateway 26. In either case, the analog system signal can be directed to a voice TCP/IP gateway 26 for conversion into a digital format, such as a TCP/IP format. Once translated to a digital format, the telephony signal can be sent to internet service provider 20 for transmission over internet 18. The digital data stream having the data set generated by the analog signal can be directed through internet 18 to telephone central office 12 to a residential or business twisted wire pair telephony network 16. A modem 28 associated with personal computer 22 can retrieve the digital data set for use by personal computer 22. Personal computer 22 can retrieve the digital data stream through internet 18 by using standard internet technology, such as a web browser.

Once the digital data stream has arrived at personal computer 22, personal computer 22 can cooperate with telephony network 16 to support further transmission of the telephony data set to telephony devices interfaced with telephony network 16, as is explained further herein. In particular, telephone control modules 30 can accept telephony signals from personal computer 22. Personal computer 22 and telephone control module 30 can communicate telephony data across telephony network 16 by using a telephony network band that lies outside of the voiceband frequency of signals received from telephone central office 12. Thus, telephony devices 32 can support normal telephony communications without interfering with central office signals or voice.

One advantage of accepting voice signals in a digital data stream is that, using data compression and other techniques, multiple voice signals can be transmitted to and used by a single twisted pair telephony network. Thus, for instance, a user can maintain a continuous internet connection with, for instance, a modem and telephone line interface to internet service provider 20. A telephone call from telephony device 14 to telephony network 16 through central office 12 can be call-forwarded on a busy signal or otherwise to voice TCP/IP gateway 26 for transmission as a telephony data set in a digital data stream over internet 18 by internet service provider 20. Thus, telephone calls directed to telephony network 16 will be connected even though personal computer 22 is interfaced with central office 12. Further, multiple telephone calls can be connected simultaneously through the same telephone number even though the number is associated with only a single twisted pair telephony network 16.

Figure 2:
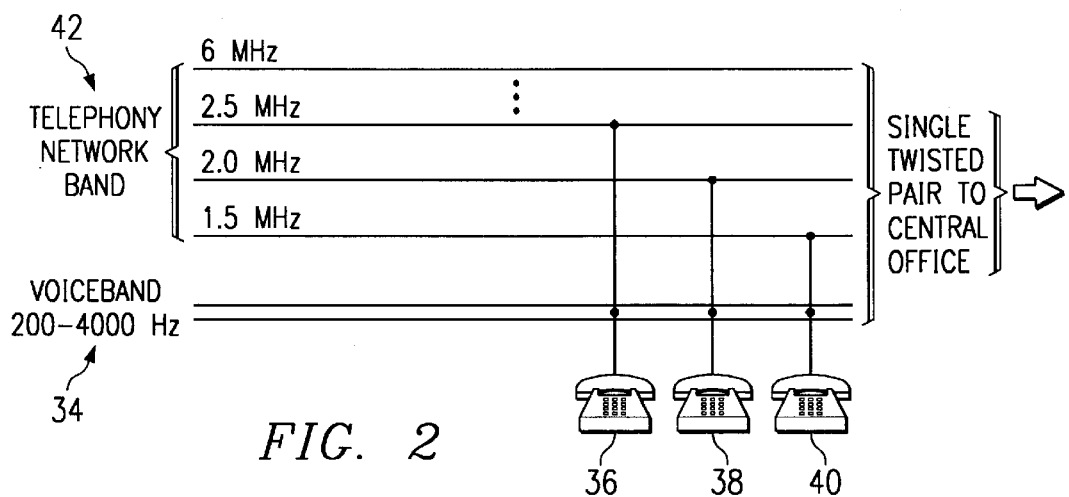
FIG. 2 depicts telephony network bands available on a typical twisted wire pair telephony network.

Referring now to FIG. 2, several telephony network band frequency ranges are illustrated as examples for supporting multiple communication signals across a single twisted pair telephony network. Typically, telephony signals are carried from a central office to a residence or business across a single twisted pair in a voiceband 34 having a frequency range of 300 to 4000 Hz. Central offices typically filter out signals received outside of the voiceband to avoid interference with central office operations.

Telephony devices 36, 38, and 40 interface with voiceband 34 to carry telephony signals to and from central offices. Typical "dumb" telephony devices, such as commercial telephone sets, are unable to use frequency bands above voiceband 34. Nonetheless, telephony devices 36, 38 and 40 necessarily interface with transmissions made above voiceband 34, as is indicated by telephony network band 42, due to each telephony devices' physical connection to the telephony network, such as a single twisted pair telephone line. Thus, for instance, telephony device 36 can receive signals sent at 2.5 MHZ through telephony network band 42, which signals can then subsequently be translated to the voiceband, even though telephony device 36 is unable to directly use such high frequency signals.

The present method and system can use a number of techniques to support transmission of telephony and other data and signals over an existing installed telephony network, such as a single twisted pair telephone network installed in a home or residence, without interfering with central office signals. First, frequency division multiplexing ("FDM") allows the transmission of multiple signals over an existing twisted pair or other telephony network by translating each signal to a unique channel located within a telephony network band. FDM can be used without interfering with central office signals by simply locating the telephony network band outside of the voiceband. For instance, as is illustrated by FIG. 2, a telephony network band of between 1.5 MHz and 6 MHz will allow the transmission of signals without interference with voiceband 34. The actual range can depend upon the capability of a given telephony network to transmit higher frequency signals without degradation; for instance, one embodiment could use a range of 1.5 MHz to 4 MHz to allow a buffer that avoids ranges in the frequency spectrum susceptible to degradation.

In one embodiment, the present invention uses a telephony network band defined by the frequency range of between 1.5 MHz and 6 MHz. This telephony network band avoids interference with the AM radio band below 1.5 MHz, and prevents signal strength degradation that can occur at high frequencies and that can make the higher frequencies ineffective for passing a signal. The telephony network band is further divided into channels, with each channel using a 100 kHz portion of the telephony network band. Two-way telephony communications, known as multiplexing, are supported by assigning a channel to each signal of each direction. For instance, an outbound telephone signal could be transmitted in a 100 kHz channel centered on the 2 MHz frequency, while an inbound telephone signal could be transmitted in a 100 kHz channel centered on the 3 MHz frequency. FDM can support 25 or more simultaneous telephone conversations over a single twisted pair telephony network by transmitting each analog telephone signal in its own channel and then translating the signals to the voiceband at each telephony device designated to receive the signal. The system can be further enhanced by using channel diversity to change channels as needed to minimize interference with outside signals or noise. Further, although this embodiment envisions using low power radio frequency signals transmitted over an existing single twisted pair telephony network, alternative embodiments could transmit signals having higher power without the need for a physical network connection, such as radio or wireless.

Alternative embodiments of the present invention can use other techniques or a combination of FDM with other techniques to provide multiple telephony functions over a single twisted pair telephony network. For instance, rather than communicating outside of the voiceband using analog signals, the present invention can communicate with digital signals, including time division multiplexing (TDM), and packet based protocols such as synchronous transfer mode (STM) and asynchronous transfer mode (ATM) protocols. A combination of FDM with the digital techniques of TDM, STM or ATM can provide multiple channels of digital data with each channel operable to carry multiple digital data sets of telephony data, thus effectively multiplying the amount of data that can be carried over the telephony network. In one embodiment, multiple telephony functions can be accomplished by transmitting digital data through a telephony network band that can include the voiceband; specifically, a spread spectrum technique can be used without significantly degrading the quality of sound through the telephony network transmitted in the voiceband.

Figure 3:
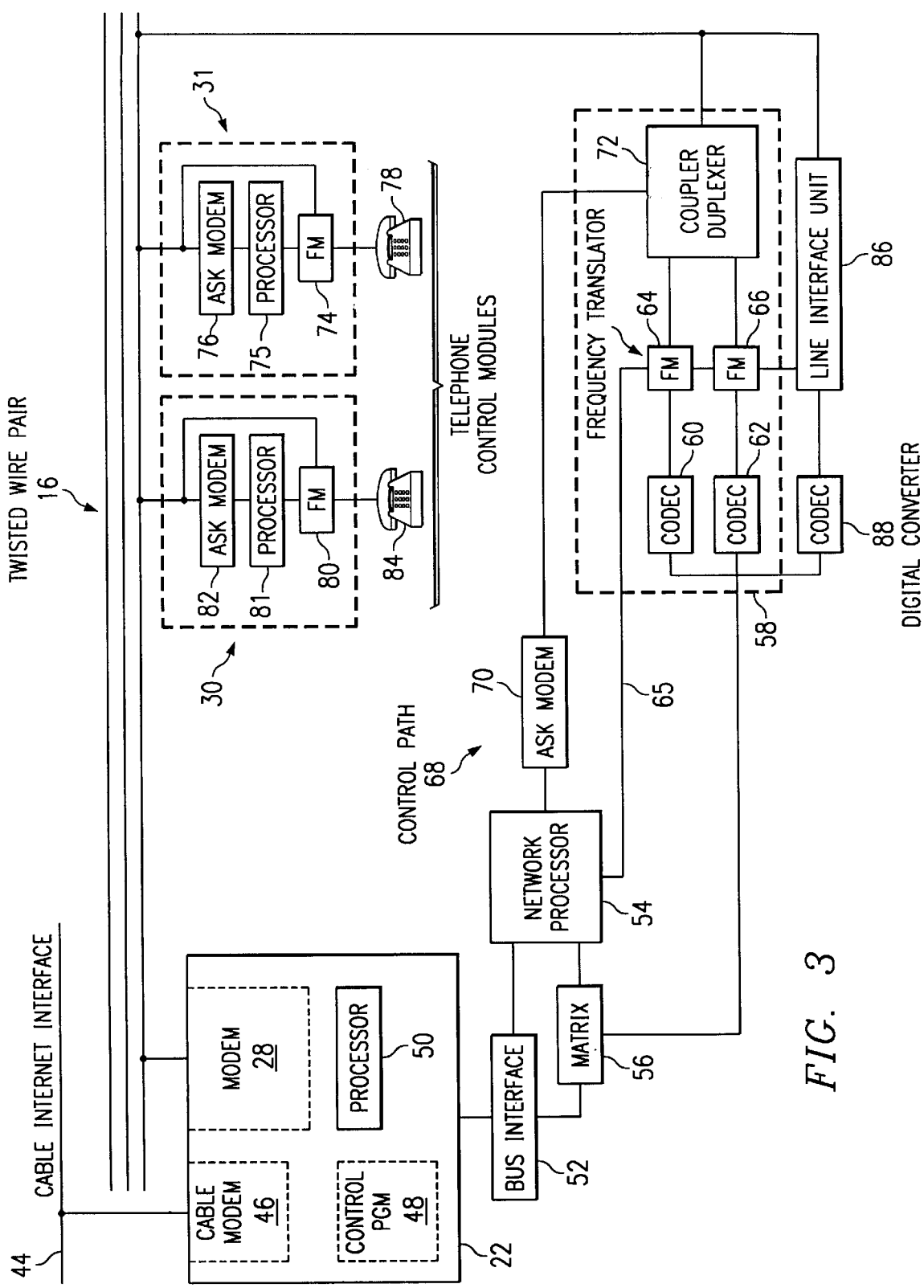
FIG. 3 depicts one embodiment of a multi-station telephony network supported by a single twisted pair telephone line.

Referring now to FIG. 3, one embodiment of the present invention is depicted in an arrangement that allows telephony devices interfaced with a twisted wire pair telephony network 16 to use transmissions in telephony network bands outside of voice band 34. To accomplish this goal telephone control modules 30 and 31 can be used, as are described in U.S. patent application Ser. No. 08/626724 entitled "Telephone Control Module and User Site Network and Methods of Operation," invented by Gordon Matthews and filed Apr. 1, 1996.

A digital data stream having telephony data sets is provided through a transmission medium in a transmission medium band to a telephony network. For instance, in FIG. 3, the transmission medium can be a coaxial cable internet interface 44 or a twisted wire pair telephone line internet interface accepted directly through twisted wire pair telephony network 16 by use of a modem 28 or other conventional device. In alternative embodiments, any transmission medium capable of providing a digital data stream can be used, including a satellite internet interface. Each transmission medium can transmit a digital data stream at a transmission medium band. A twisted wire pair telephone interface typically transmits in the voiceband, whereas broadband transmission mediums, such as coaxial cable, can transmit in transmission medium bands having a much larger span of frequencies. Cable interface 44 will allow the transmission of large amounts of digital data due to the larger bandwidth available when compared to a telephone modem. Another advantage of a cable modem is that it does not use a direct connection with the twisted wire pair telephony network 16. Thus, the telephony network band used to communicate with the telephony devices does not have to exclude the transmission medium band of the cable modem since no direct physical connection exists between the cable interface and telephony network 16. By comparison, the twisted wire pair telephone line interface with telephony network 16 provides a direct physical connection to the central office which allows signals received from the central office to pass throughout telephony network 16, and allows signals generated by devices interfaced with telephony network 16 to pass to the central office.

Personal computer 22 includes a modem 28 that can accept a digital data stream transmitted from a central office to twisted wire pair telephony network 16. The digital data stream can be provided in a TCP/IP format such as through internet 18. In alternative embodiments, the digital data stream can be provided to computer 22 or other computing devices through other data interfaces. For instance, computer 22, can receive data from an ISDN connection, from a cable internet interface 44 through a cable modem 46, from a second telephone line, from a satellite internet interface, or other convention interface. The greater the bandwidth of the transmission medium band for the selected transmission medium, the greater the amount of data included with the digital data stream, and the greater the number of telephony devices that can be simultaneously supported over a twisted wire pair telephony network 16.

A control program 48 directs a processor 50 to deliver telephony data sets inserted within the digital data stream to a bus interface 52. Processor 50 can also transmit commands through bus interface 52 to a network processor 54 which allows network processor 54 to identify telephony data sets delivered through bus interface 52. Control program 48 can be written in conventional software languages for operation on conventional personal computers, work stations or other devices, and can provide additional functions as needed to make the system user friendly. Processor 50 can be conventional processors for personal computers and work stations, such as INTEL processors operating with WINDOWS operating system and conventional memory and other personal computer devices. Alternatively, a specially designed computer system can be used, such as the master telephone control module described in Gordon Matthews' "Telephone Control Module and User Site Network and Method of Operation" previously described herein.

Bus interface 52 can support the transmission of multiple sets of telephony data by, for example, using PCI or ISA bus standards. Processor 50, network processor 54 and matrix 56 cooperate to divide the telephony data sets for decoding by converter circuitry 58. Thus, a code-decode 60 can accept one telephony data set for decoding into an analog telephony signal, and a second code-decode 62 can accept a second telephony data set for decoding to a second telephony signal. The first and second telephony signals are then provided to frequency translators 64 and 66 respectively, which can be conventional frequency modulators.

A control path 68 enables the transmission of control instructions over twisted pair telephony network 16 by using command and control signaling, such as with ASK or FSK modems. Each ASK modem transmits and receives control instructions in a control band of approximately 300 to 350 KHz, which avoids interference with the telephony network band and the voiceband. Network processor 54 identifies a telephony network band channel for each telephony data set and provides that channel frequency information through control path 68 and ASK modem 70 to coupler diplexer 72 and to ASK modems 76 and 82. Telephone control module processors 81 and 75 interface with ASK modems 82 and 76 to provide the frequency information to frequency modulators 80 and 74 to support modulation of a telephony network signal from a channel within the telephony network band to the voiceband for use by telephony devices 84 and 78.

For instance, the first data set is converted to a first telephony signal by code-decode 60 and then translated to a first channel in the telephony network band, such as a channel located at 1.5 MHz, by frequency translator 64. Frequency translators 64 and 66, and line interface unit 86 can each receive instructions from network processor 54 through a second control path 65. The second telephony data set is converted to a second telephony signal by code-decode 62 and translated to a second channel in the telephony network band, such as a channel located at 2 MHz, by frequency translator 66, also according to instructions received from network processor 54. Coupler diplexer 72 combines the first and second telephony signals for transmission over twisted wire pair telephony network 16.

Network processor 54 also provides instructions through ASK modem 70 which identifies one or more telephone control modules 30 or 31 as a destination for each telephony signal. As an example, network processor 54 can identify a first data set converted by code-decode 60 as destined for telephone control module 31. Thus, network processor 54 will instruct frequency translator 64 to transmit the first telephony signal in the telephony network band at a channel of 1.5 MHz, and network processor 54 will instruct frequency translator 74 through ASK modem 76 and telephone control module processor 81 to receive signals at the 1.5 MHz channel. Frequency translator 74 can then translate the first telephony signal to the voiceband for use by telephony device 78. Simultaneous with the transmission of the first telephony signal in the 1.5 MHz channel, network processor 54 can direct transmission of the second telephony signal in the telephony network band at a channel of 2.5 MHz, and can direct frequency translator 80 through ASK modem 82 and telephone control module processor 85 to provide telephony device 84 with the second telephony signal by translating the second telephony signal from the 2.5 MHz channel to the voiceband.

Communications from telephony devices 84 and 78 can be supported in a manner similar to communications to the telephony devices. Network processor 54 simply assigns a channel in the telephony network band to each telephone control module interfaced with telephony network 16. Thus, for instance, if telephony device 84 is taken off hook, network processor 54 can provide frequency translator 80 with a telephony network band assignment to avoid any transmissions by telephony device 84 in the voice band. A user of telephony device 84 can enter dialing information in a conventional format, or with the aid of control program 48, such as by identifying address information for the call recipient, such as a telephone number or internet address. Processor 50 and control program 48 can receive this information and connect the call by conventional means, or through the internet.

To support telephony communications without an internet interface through modem 28, a line interface unit 86 is interfaced with twisted wire pair telephony network 16. Line interface unit 86 accepts conventional signals provided from the central office and transmits the signals to code-decode 88 for conversion to digital data. From code-decode 88, the digital data is transmitted through matrix 56 and bus interface 52 for processing by processor 50 in accordance with control program 48. Thus, personal computer 22 can respond to incoming call signals and can process the call signals as needed. For instance, if the incoming call signal is a fax, control program 48 can detect this and send the fax to a printer or to data storage without activating other telephony devices interfaced with telephony network 16. If the incoming call is for a person, the control program can provide the caller with a message that allows the caller to identify the specific person called, and can then direct the call to an appropriate telephone control module as is described in Gordon Matthew's patent "Telephone Control Module and User Site Network and Methods of Operation" as set forth herein.

In alternative embodiments, the present invention can use modified configurations to support multiple telephony signals. For instance, the hardware for performing the functions of converter circuitry 58 and control path 68 can be incorporated into card for insertion in a personal computer. As another example, conversion between digital and analog signals can occur at different points throughout the system. The configuration depicted in FIG. 3 accepts telephony digital data sets from matrix 56 so that code-decodes 60 and 62 can convert the data sets to telephony signals for transmission in independent channels of the telephony network band. This configuration advantageously limits the need for code-decodes since each code-decode unit can be assigned by control path 68 to telephone control modules as need; thus, a code-decode is not required for each telephone control module. In one alternative embodiment, the code-decodes could be included with the telephone control modules, or in the telephones themselves. Thus, the signals transmitted through telephony network 16 would remain in a digital format until they reached their respective telephone control modules. In alternative embodiments, the digital format could include TCP/IP, TDM, ATM or STM formats.

In operation, the present invention can support telephony and other communications through internet 18 or in any number of ways. A user can establish an internet interface through personal computer 22 by using either modem 28 or cable modem 46. The user can retrieve a digital data stream having telephony data sets through a conventional World Wide Web browser, such as a NETSCAPE NAVIGATOR browser. For instance, the user can establish an interface with a voice TCP/IP gateway through internet 18. If the internet interface is established with twisted wire pair telephony network 16 through central office 12, the telephony network cannot typically accept additional telephony signals from central office 12. If the internet interface is established through cable internet interface 44 or another interface, then telephony network 16 can remain available for accepting calls directly from central office 12.

Once an internet connection is established, multiple users can simultaneously interact with multiple telephony devices interfaced with telephony network 16. Using telephone calls as an example, first and second users can pick up telephone 84 and 78. Control path 68 will assign telephone control modules 30 and 31 channels in the telephony network band as appropriate, and telephone control modules 30 and 31 will each send an off-hook signal to personal computer 22 via control path 68. Control program 48 can then direct processor 50 to provide each telephone with menu selections such as placing a conventional telephone call, placing an internet call, contacting another telephone control module by initiating a unique ring, leaving a voice mail message, or other functions. Each user can select an option as desired by pushing predetermined telephone numbers or speaking commands for interpretation by voice interpreter software located within control program 48. If the user initiates an outbound telephone call through internet 18, control program 48 can direct the forwarding of appropriate calling information to voice TCP/IP gateway 26 which, in turn, can place the call through internet 18 to an appropriate internet address, or can place the call through a central office 12 using conventional telephony signals.

Users can receive inbound calls at telephony network 16 through internet 18 in a manner similar to that by which calls are sent from telephony network 16. A digital data stream having a telephony data set with the telephone call data is directed through internet 18 to personal computer 22. Control program 48 directs processor 50 and control loop 68 to provide the telephony data set to one or more telephone control modules as desired. For instance, if the inbound telephone call is directed to a specific internet address, control program 48 can direct the inbound call to a specific telephone control module, or can direct all telephones interfaced with telephone control modules to ring in a distinctive way. Alternatively, control program 48 can respond to an inbound call by providing the caller with a menu selection for associating the call with a specific user of telephony network 16, or with a specific telephone control module.

When a user establishes an internet connection through modem 28 and telephony network 16, inbound calls cannot typically be accepted through telephony network 16, and will typically be provided with a busy signal by central office 12. In one embodiment, such calls can be call forwarded using conventional call forwarding functions to voice TCP/IP gateway 26. Gateway 26 can convert the forwarded call to a digital telephony data set for insertion in a digital data stream. Telephony network 16 can receive the digital data stream through the existing internet interface and can then provide the call to telephony network 16. Thus, the inbound call will be connected in a manner essentially invisible to the calling and called parties.

Although the above examples describe how the present invention can handle inbound and outbound telephone calls, other telephony data can be handled in a similar manner. For instance, video, fax, or other telephony device data could be transmitted in a similar manner. Alternatively, electronic data such as e-mail or internet World Wide Web pages could be provided to telephone control modules for transfer to computing devices, such as a Web TV or other simple computer. In addition, the digital data stream can include data for devices unrelated to telephony. For instance, the digital data stream can include control data for monitoring and controlling a residence or business' environment, for monitoring a security system, or for reading a meter for gas, electricity or other utilities and transferring the meter data to an appropriate location. Such control data transmissions can have a dedicated network band or channel as need to support the equipment interfaced with the telephony network. Further, the digital data stream can be encrypted to protect the privacy of the information included in it.

Although the present invention has been described in detail, it should be understood that various changes, substitutions and alterations can be made hereto without departing from the spirit and scope of the invention as defined by the appended claims.

DECLARATION AND POWER OF ATTORNEY

As a below named inventor, I declare that:

My residence, post office address and citizenship are as stated below next to my name, that I believe I am the original, first and joint inventor of the subject matter which is claimed and for which a patent is sought on the invention or design entitled A METHOD AND SYSTEM FOR INTERFACING A TELEPHONY NETWORK AND A DIGITAL DATA STREAM the specification of which is attached hereto; that I have reviewed and understand the contents of the above-identified specification, including the claims, as amended by any amendment referred to above; and that I acknowledge the duty to disclose to the U.S. Patent and Trademark Office all information known to me to be material to patentability as defined in 37 C.F.R. §1.56.

I hereby claim foreign priority benefits under 35 U.S.C. §119 of any foreign application(s) for patent or inventor's certificate listed below and have also identified below any foreign application(s) for patent or inventor's certificate having a filing date before that of the application on which priority is claimed:

| Number | Country | Date Filed | Priority Claimed | |
|---|---|---|---|---|
| | | | (Yes) | (No) |
| NONE | | | | |

I hereby claim the benefit under 35 U.S.C. §120 of any United States application(s) listed below and, insofar as the subject matter of each of the claims of this application is not disclosed in the prior United States application(s) in the manner provided by the first paragraph of 35 U.S.C. §112, I acknowledge the duty to disclose to the U.S. Patent and Trademark Office all information known to me to be material to patentability as defined in 37 C.F.R. §1.56 which became available between the filing date of the prior application(s) and the national or PCT international filing date of this application:

| application Ser. No. | Date Filed | Status |
|---|---|---|
| NONE | | |

I hereby appoint:

| | |
|---|---|
| Jerry W. Mills | Reg. No. 23,005 |
| Robert M. Chiaviello, Jr. | Reg. No. 32,461 |
| Ann C. Livingston | Reg. No. 32,479 |
| Thomas R. Felger | Reg. No. 28,842 |
| Charles S. Fish | Reg. No. 35,870 |
| Wei Wei Jeang | Reg. No. 33,305 |
| Kevin J. Meek | Reg. No. 33,738 |
| T. Murray Smith | Reg. No. 30,222 |
| Barton E. Showalter | Reg. No. 38,302 |
| David G. Wille | Reg. No. 38,363 |
| Bradley P. Williams | Reg. No. 40,227 |
| Terry J. Stalford | Reg. No. 39,522 |
| Christopher W. Kennerly | Reg. No. 40,675 |
| Harold E. Meier | Reg. No. 22,428 |
| Alexander B. Ching | Reg. No. P41,669 |
| Stacy S. Cook | Reg. No. P42,435 |
| Douglas M. Kubehl | Reg. No. P41,915 |
| Samir A. Bhavsar | Reg. No. P41,617 |
| Thomas R. Nesbitt, Jr. | Reg. No. 22,075 |
| James J. Maune | Reg. No. 26,946 |
| Roger J. Fulghum | Reg. No. 39,678 |
| Anthony E. Peterman | Reg. No. 38,270 |
| Rodger L. Tate | Reg. No. 27,399 |
| Scott F. Partridge | Reg. No. 28,142 |
| James B. Arpin | Reg. No. 33,470 |
| James Remenick | Reg. No. 36,902 |
| Jay B. Johnson | Reg. No. 38,193 |
| Robert W. Holland | Reg. No. 40,020 |
| Floyd B. Chapman | Reg. No. P40,555 |
| Randall M. Mishler | Reg. No. P42,006 | all of the firm of Baker & Botts, L.L.P., my attorneys with full power of substitution and revocation, to prosecute this application and to transact all business in the United States Patent and Trademark Office connected therewith, and to file and prosecute any international patent applications filed thereon before any international authorities.

| Send Correspondence To: | Direct Telephone Calls To: |
|---|---|
| Baker & Botts, L.L.P. | Robert W. Holland |
| 2001 Ross Avenue | at (512) 322-2693 |
| Dallas, Texas 75201-2980 | Atty. Docket No. 021223.0117 |

I declare that all statements made herein of my own knowledge are true and that all statements made on information and belief are believed to be true; and further that these statements were made with the knowledge that willful false statements and the like so made are punishable by fine or imprisonment, or both, under Section 1001 of Title 18 of the United States Code, and that such willful false statements may jeopardize the validity of the application or any patent issuing thereon.

What is claimed is:

1. A method for interfacing a telephony network and a digital data stream, the method comprising the steps of:
   transmitting the digital data stream over the Internet to the telephony network, the digital data stream having first and second voice data sets;
   converting the first voice data set to a first voice signal;
   converting the second voice data set to a second voice signal;
   transmitting the first voice signal in a telephony network band through the telephony network to a first telephony device; and
   transmitting the second voice signal in a telephony network band through the telephony network to a second telephony device.

2. The method according to claim 1 wherein the telephony network comprises a single twisted pair.

3. The method according to claim 2 wherein the first voice signal and the second voice signal are transmitted simultaneously through the single twisted pair.

4. The method according to claim 3 wherein the Internet interfaces with the telephony network through a cable modem.

5. The method according to claim 4 further comprising the step of translating the first voice signal from the telephony network band to the voiceband for use by the first telephony device.

6. The method according to claim 1 further comprising the steps of:
   generating an outbound voice signal in the voiceband with the first telephony device;
   translating the outbound voice signal from the voiceband to the telephony network band;
   transmitting the outbound voice signal in the telephony network band through the telephony network;
   converting the outbound voice signal to an outbound data set;
   inserting the outbound data set into an outbound digital data stream; and
   transmitting the outbound digital data stream over the Internet.

7. The method according to claim 6 wherein the first telephony device is a telephone, and wherein the outbound voice signal is an analog telephone voice signal.

8. A multi-station telephone system comprising:
   a telephony network having plural telephony nodes, at least one of the telephony nodes operable to receive a digital data stream from the Internet, the digital data stream having first and second voice data sets;
   a digital converter associated with the telephony network, the digital converter operable to convert the first and second voice data sets into first and second voice signals;

first and second frequency translators associated with the telephony network, the first frequency translator operable to transmit the first voice signal in a telephony network band to the telephony network, the second frequency translator operable to transmit the second voice signal in the telephony network band to the telephony network; and first and second telephone control modules, associated with the telephony network, the first telephone control module operable to provide the first voice signal to a first telephony device, the second telephone control module operable to provide the second voice signal to a second telephony device.

9. The system according to claim 8 wherein the telephony network comprises a single twisted pair.

10. The system according to claim 8 wherein the Internet interfaces with the telephony network through a telephone line.

11. The system according to claim 8 wherein the Internet interfaces with the telephony network through a coaxial cable.

12. The system according to claim 8 wherein the first telephone control module comprises a frequency translator operable to receive the first voice signal in the telephony network band and to translate the first voice signal to the voiceband.

13. The system according to claim 8 wherein:

the first telephony device is operable to generate an outbound voice signal for transmission to the first telephone control module;

the first telephone control module is operable to transmit the outbound voice signal at the telephony network band to the telephony network;

the first frequency translator is operable to receive the outbound voice signal and to provide the outbound voice signal to the digital converter at the telephony network band; and the digital converter is operable to convert the outbound voice signal to an outbound data set and to insert the outbound data set into an outbound data stream for transmission through the Internet.

14. The system according to claim 13 wherein the transmission medium comprises a telephone line, and wherein the transmission medium band comprises the voiceband.

15. The system according to claim 14 wherein the telephony network band lies outside of the voiceband.

16. A method for interfacing a digital data stream with a telephony network, the telephony network having plural telephony devices, the method comprising the steps of:

transmitting a digital data stream in the voice band through the Internet to the telephony network, the digital data stream having first and second data sets, the first data set having voice signal data associated with first telephony device, the second voice signal data associated with a second telephony device;

converting the first data set to a first voice signal;

converting the second data set to a second voice signal;

transmitting the first voice signal to the first telephony device in a telephony network band, the telephony network band being located outside of the voice band; and transmitting the second voice signal to the second telephony device in the telephony network band.

17. The method according to claim 16 wherein the first data set is associated with at least one of the plural telephony network devices but not all of the plural telephony network devices.

18. The method according to claim 16 further comprising the steps of:

receiving the first voice signal at a first telephony device;

translating the first voice signal from the telephony network band to the voice band; and transmitting the first telephony signal in the voiceband at the telephony device.

19. The method according to claim 18 wherein the telephony device comprises an analog telephone.

20. The method according to claim 18 further comprising the steps of:

generating an outbound voice signal in the voiceband with the first telephony device;

translating the outbound voice signal from the voiceband to the telephony network band;

transmitting the outbound voice signal in the telephony network band through the telephony network;

converting the outbound voice signal into an outbound data set; and inserting the outbound data set into the digital data stream for transmission through the Internet.

21. The method according to claim 20 wherein the telephony device comprises a telephone.

22. The method according to claim 20 wherein the telephony network comprises a single twisted pair installed in a residence.

23. A telephone system comprising:

a telephony network operable to receive telephony signals in the voiceband;

at least first and second telephony devices interfaced with the telephony network;

a digital data stream interfaced with the telephony network through the Internet, the digital data stream having at least first and second telephony data sets;

a digital converter interfaced with the telephony network, the digital converter operable to convert the telephony data sets into inbound telephony data signals, the digital converter further operable to transmit the inbound telephony data signals across the telephony network at a telephony network band, the telephony network band located outside the voiceband; and at least one telephone control module, the telephone control module associated with at least one telephony device, the telephone control module operable to receive one of the inbound telephony data signals in the telephone network band, the telephone control module further operable to translate the inbound telephony data signal to the voiceband for transmission to the at least one telephony device.

24. The system according to claim 23 wherein:

the telephone control module is further operable to receive an outbound telephony signal in the voiceband from the at least one telephony device, and to transmit the outbound telephony signal to the digital converter at the telephony network band; and the digital converter is further operable to convert the outbound telephony signal to an outbound telephony data set, and to insert the outbound telephony data set into the digital data stream for transmission through the Internet.

25. The system according to claim 24 further comprising:

a processor interfaced with the digital data stream, the processor operable to identify telephony data sets within the digital data stream, each telephony data set associated with at least one predetermined telephone control module; and a control path interfaced with the processor and the at least one telephone control modules, the control path operable to direct the predetermined at least one telephone control module to receive telephony data sets identified by the processor as associated with the predetermined at least one telephone control module.

26. The system according to claim 25 wherein:

each telephone control module is further operable to accept destination data from an associated telephony device, and to provide the destination data to the processor; and the processor is further operable to insert the outbound telephony data set associated with the telephone control module into the digital data stream so that the outbound telephony data set is directed to a destination according to the destination data.

27. The system according to claim 23 wherein the telephony network comprises a single twisted pair.

28. The system according to claim 27 wherein the digital data stream interfaces with the telephony network through the voiceband.

29. A method for interfacing a digital data stream with a telephony network, the telephony network having plural telephony devices, the method comprising the steps of:

transmitting a digital data stream through the Internet to the telephony network through a cable modem, the digital data stream having a first data set associated with at least one of the plural telephony devices and a second data set associated with at a least a second one of the plural telephony devices;

transmitting the first and second data sets through the telephony network in a telephony network band; and converting the first and second data sets to first and second voice telephony signals for use by the telephony devices associated with each data set.

30. The method according to claim 29 wherein the first data set is associated with at least one of the plural telephony network devices but not all of the plural telephony network devices.

31. The method according to claim 29 wherein the first data set is transmitted using packet-based techniques.

32. The method according to claim 29 wherein the telephony device comprises a facsimile device.

33. The method according to claim 29 further comprising the steps of:

generating an outbound telephony signal in the voiceband with one of the associated telephony devices;

converting the outbound telephony signal into an outbound data set;

translating the outbound data set from the voiceband to the telephony network band;

transmitting the outbound data set in the telephony network band to the telephony network; and inserting the outbound data set into the digital data stream.

34. The method according to claim 33 wherein the telephony device comprises a telephone.

35. The method according to claim 33 wherein the telephony network comprises a single twisted pair installed in a residence.

36. The method according to claim 35 wherein the telephony device comprises a telephone.

37. The method according to claim 35 wherein the telephony network comprises a single twisted pair installed in a residence.

* * * * *